(12) United States Patent
Tseng

(10) Patent No.: US 11,204,472 B1
(45) Date of Patent: Dec. 21, 2021

(54) CONNECTOR SHROUD

(71) Applicant: ACSUPER TECHNOLOGIES INC., Myau-Li County (TW)

(72) Inventor: Chung-Ming Tseng, Myau-Li County (TW)

(73) Assignee: Acsuper Technologies Inc., Myau-Li County (TW)

( * ) Notice: Subject to any disclaimer, the term of this patent is extended or adjusted under 35 U.S.C. 154(b) by 0 days.

(21) Appl. No.: 17/062,733

(22) Filed: Oct. 5, 2020

Related U.S. Application Data

(60) Provisional application No. 63/035,065, filed on Jun. 5, 2020.

(30) Foreign Application Priority Data

Sep. 10, 2020 (CN) .......................... 202010948195.8

(51) Int. Cl.
  *G02B 6/36* (2006.01)
  *G02B 6/38* (2006.01)
(52) U.S. Cl.
  CPC ......... *G02B 6/3894* (2013.01); *G02B 6/3825* (2013.01)
(58) Field of Classification Search
  CPC ....... G02B 6/3894; G02B 6/3825; G02B 6/36
  See application file for complete search history.

(56) References Cited

U.S. PATENT DOCUMENTS

| | | | | |
|---|---|---|---|---|
| 7,959,361 | B2 * | 6/2011 | Lu | G02B 6/3887 385/53 |
| 8,917,967 | B2 * | 12/2014 | Kempeneers | H01R 13/516 385/139 |
| 8,942,532 | B2 | 1/2015 | Greub et al. | |
| 9,122,021 | B2 | 9/2015 | Elenbaas et al. | |
| 9,638,868 | B2 * | 5/2017 | Ott | G02B 6/3825 |
| 10,649,152 | B1 | 5/2020 | Yang | |
| 2012/0141086 | A1 | 6/2012 | Greub et al. | |
| 2020/0116957 | A1 | 4/2020 | Takano et al. | |

* cited by examiner

*Primary Examiner* — Jennifer Doan
(74) *Attorney, Agent, or Firm* — Rosenberg, Klein & Lee

(57) ABSTRACT

The connector shroud of the present invention includes an inner housing, a coupling nut and a lock nut. The inner housing is hollow and a grooved control link is formed on the outer surface of the inner housing. The grooved control link extends in a longitudinal direction. The coupling nut is hollow and is sleeved onto the inner housing. A receiving recess is formed on the inner surface of the front end of the coupling nut for accommodating a protrusion provided on a flange. A tab protrudes from the rear end of the coupling nut. A control slot is formed on the tab and includes a first section and a second section. The second section communicates with the first section and extends in a direction not parallel to the longitudinal direction. The lock nut is hollow and sleeved onto the inner housing. A first pin and a second pin are formed on the inner surface of the lock nut. The first pin is disposed in the grooved control link. The second pin is located in the second section, wherein the movement of the lock nut causes the coupling nut to rotate.

10 Claims, 16 Drawing Sheets

CONNECTOR SHROUD

RELATED APPLICATION

The present application claims priority to U.S. Provisional Application Ser. No. 63/035,065, filed on Jun. 5, 2020, and to Chinese Patent Application Number 202010948195.8, filed on Sep. 10, 2020, the disclosures of which are hereby incorporated by reference herein in their entirety.

BACKGROUND

1 Technical Field

This invention generally relates to a connector shroud, more particularly, to an optical fiber connector weather shroud.

2. Description of the Related Art

Recently, the use of fiber optics for communications purposes has grown immensely. Data, voice, and other communication networks are increasingly using fiber optics to carry information. An optical fiber is generally a glass fiber configured to carry light. Individual fibers may be grouped into a line capable of carrying large amounts of data simultaneously.

When constructing a fiber optic network, each individual fiber is generally connected to both a source and a destination device. Additionally, along the fiber optic run between the source and the destination, various connections or couplings may be made on the optical fiber to adjust the length of the fiber. Each connection or coupling requires a connector and adapter to align the fibers such that the light can transmit without interruption.

Referring to FIG. 1, a connector system for optical fibers and electrical conductors is disclosed in U.S. Pat. No. 9,755,382. The main feature of the design is that after the coupling nut 18 has been twisted into a closed position, it can be locked in place by the lock ring 26. The above-mentioned locking method is to twist the coupling nut 18 clockwise and then push the lock ring 26 forward to press against the coupling nut 18 to prevent the coupling nut 18 from rotating. To unlock, the lock ring 26 is pulled backward and the coupling nut 18 is twisted counterclockwise. It should be noted that if the operator forgets to push up the lock ring 26 after locking the coupling nut 18, the coupling nut 18 cannot be ensured to remain in the closed position.

Further, the above design has the advantage of that the locking and unlocking motions require sufficient clearance for the operator to grip and twist the connector. Since it is necessary to leave space for the operator's hands to manipulate the connector, it is not possible for connectors to be installed side-by-side close to one another. This limits the density of connectors that can be installed in a panel and requires larger spacing between connectors on the panel.

SUMMARY

In view of the above, the present invention provides a connector shroud that the locking and unlocking of the connector shroud can be implemented by an operator with only one hand.

In the first embodiment, the connector shroud of the present invention includes an inner housing, a coupling nut and a lock nut. The inner housing has a grooved control link formed on an outer surface thereof. The grooved control link has a first section, a second section, and a third section that communicate with each other, wherein the second section extends in a longitudinal direction. The coupling nut is sleeved onto the inner housing for being coupled to an object. The lock nut is sleeved onto the inner housing and includes a pin formed on an inner surface thereof, wherein the pin is movable in the grooved control link. When the pin is in second section, pulling the lock nut causes the lock nut to move away from the coupling nut. When the pin is in the first section or the third section, twisting the lock nut causes the coupling nut to rotate.

In the second embodiment, the connector shroud of the present invention includes an inner housing, a coupling nut and a lock nut. The inner housing has a grooved control link formed on an outer surface thereof, wherein the grooved control link extends in a longitudinal direction. The coupling nut is sleeved onto the inner housing for being coupled to an object. The coupling nut includes a tab extending from a rear end thereof. The tab has a control slot formed thereon. The control slot has a first section and a second section communicating with the first section, wherein the second section extends in a direction not parallel to the longitudinal direction. The lock nut is sleeved onto the inner housing and includes a first pin and a second pin formed on an inner surface thereof, wherein the first pin is movable in the grooved control link and the second pin is movable in the control slot. When the second pin is in the second section, a movement of the lock nut causes the coupling nut to rotate.

BRIEF DESCRIPTION OF THE DRAWINGS

Other objects, advantages, and novel features of the present invention will become more apparent from the following detailed description when taken in conjunction with the accompanying drawings.

DETAILED DESCRIPTION OF THE PREFERRED EMBODIMENT

Figure 1:
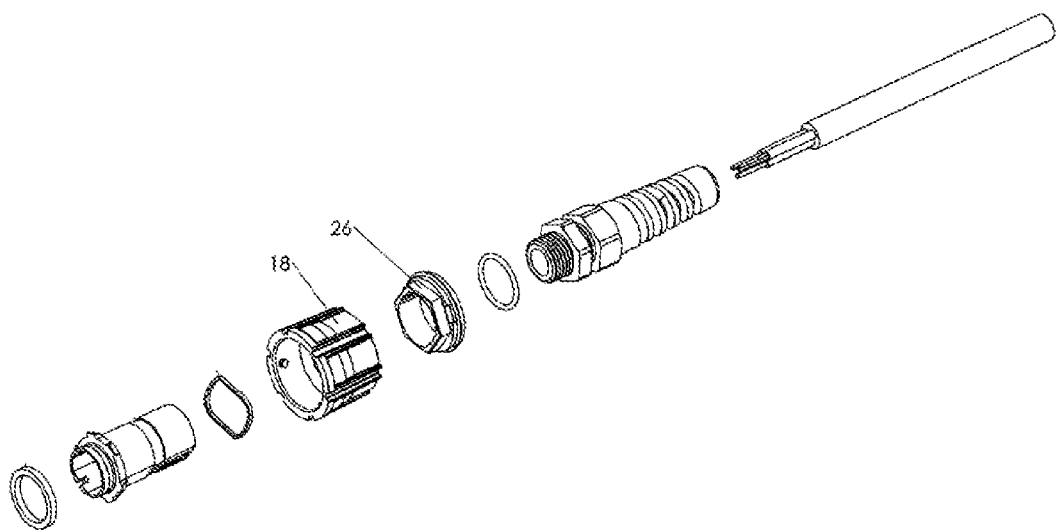
FIG. 1 illustrates a conventional connector system.
Figure 2:
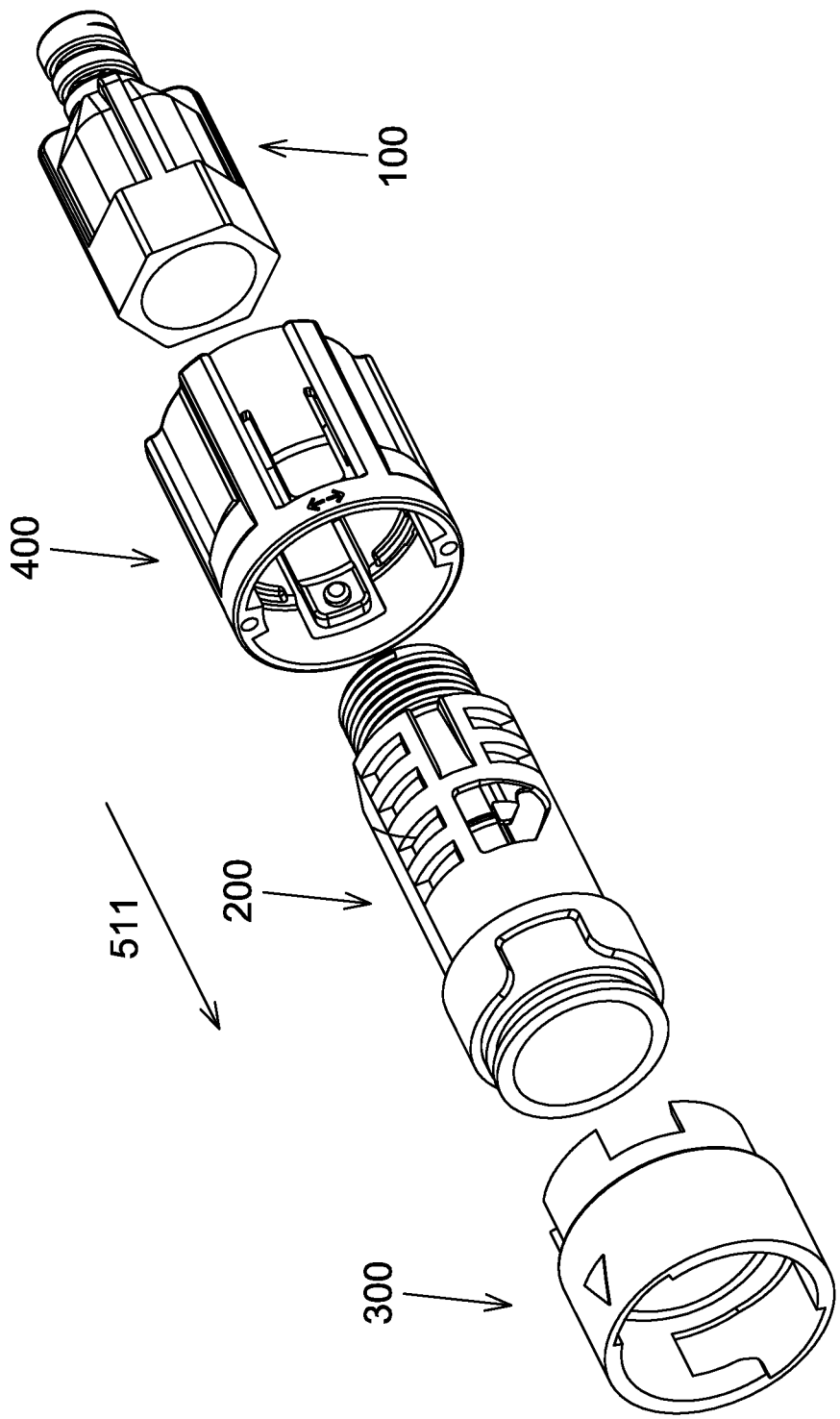
FIG. 2 is an exploded view of the connector shroud according to the first embodiment of the present invention.

Referring to FIG. 2, which is an exploded view of the connector shroud according to the first embodiment of the present invention. As shown in the figure, the connector shroud includes a cable gland 100, an inner housing 200, a coupling nut 300 and a lock nut 400. The cable gland 100, the inner housing 200, the coupling nut 300 and the lock nut 400 may be constructed of plastics by an injection molding process.

The cable gland 100 may be made from a flexible material and provide strain relief on cable (not shown) using materials and attachment techniques as are known in the art. The cable gland 100 has a hollow body whose lengthwise direction is parallel to a longitudinal direction 511. The cable gland 100 has a hexagonal shape at its front end for being coupled to the inner housing 200.

Figure 3A:
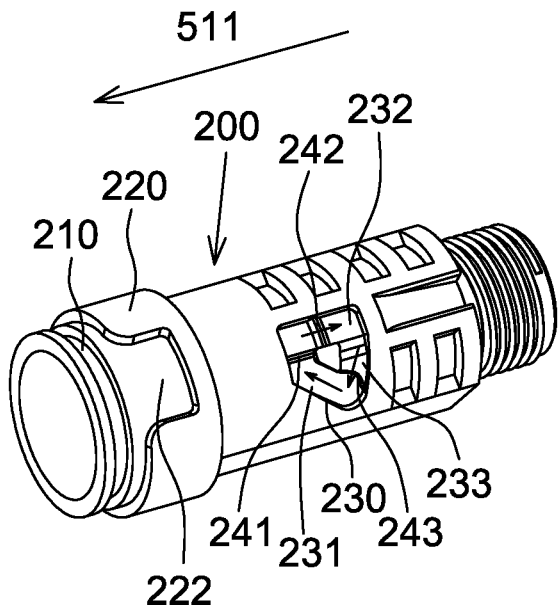
FIGS. 3a and 3b are different elevated perspective views of the inner housing of the connector shroud according to the first embodiment of the present invention.
Figure 3B:
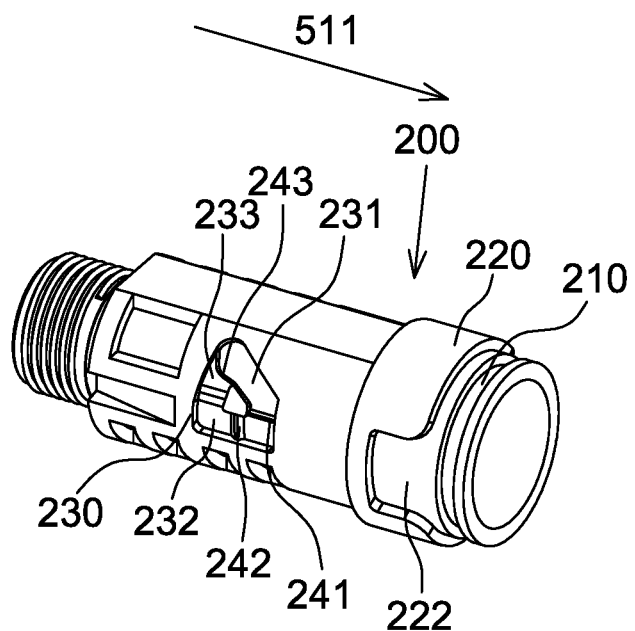

Referring to FIGS. 3a and 3b, the inner housing 200 is hollow and has a cylindrical body whose lengthwise direction is parallel to the longitudinal direction 511. An annular groove 210 is formed at the front section of the outer surface of the inner housing 200 for receiving a sealing ring (not shown). An annular protrusion 220 located behind the annular groove 210 is formed on the outer surface of the inner housing 200. Two mutually opposite recesses 222 are formed on the annular protrusion 220. Two identical grooved control links 230 are arranged on the outer surface of the inner housing 200 on two opposite sides. Each of the grooved control links 230 has a closed endless configuration and substantially three functional sections including a first section 231, a second section 232 and a third section 233. The second section 232 extends in the longitudinal direction 511. A bump 242 is formed at the bottom of the center of the second section 232. A step 241 is formed at the junction of the first section 231 and the second section 232. The step 241 is higher than the bottom of the second section 232. A step 243 is formed at the junction of the first section 231 and the third section 233. The step 243 is higher than the bottom of the first section 231.

Figure 4A:
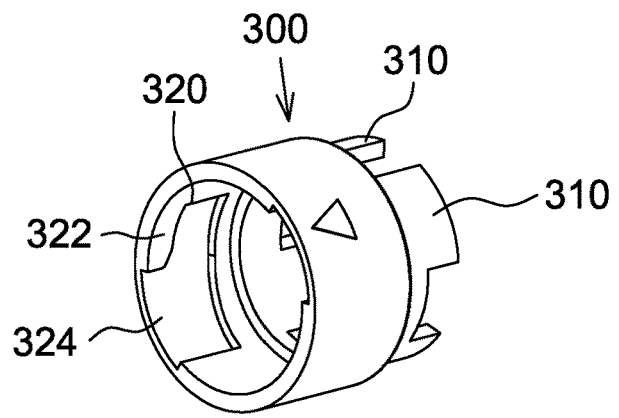
FIGS. 4a to 4c are different elevated perspective views of the coupling nut of the connector shroud according to the first embodiment of the present invention.
Figure 4B:
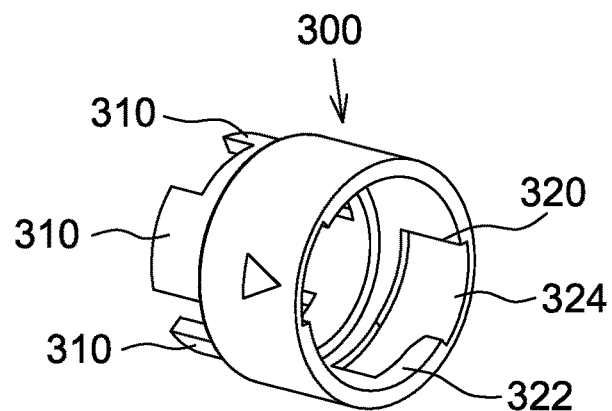
Figure 4C:
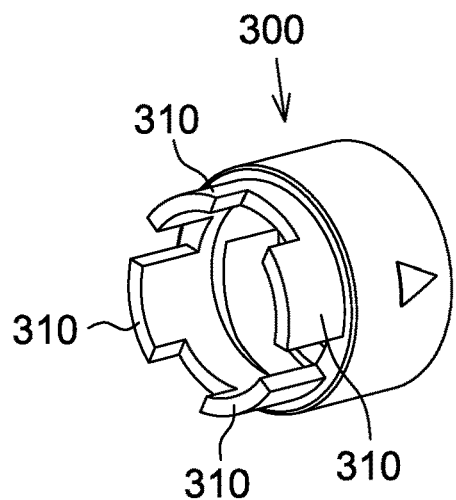

Referring to FIGS. 4a, 4b and 4c, the coupling nut 300 is hollow and has a cylindrical body for being sleeved onto the inner housing 200. A plurality of tabs 310 with an arc-shaped cross-section protrudes from the rear end of the coupling nut 300. Two mutually opposite receiving recesses 320 are formed at the front section of the inner surface of the coupling nut 300. A retaining wall 322 is arranged transversely in front of the receiving recess 320 and a gap 324 is formed on the left side of the retaining wall 322.

Figure 5A:
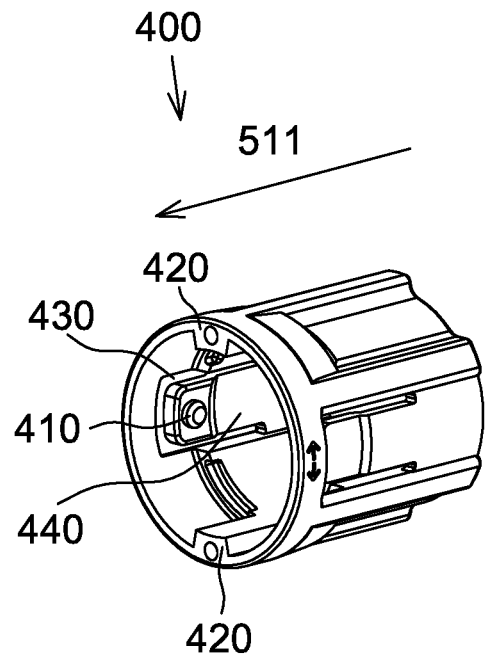
FIGS. 5a and 5b are different elevated perspective views of the lock nut of the connector shroud according to the first embodiment of the present invention.
Figure 5B:
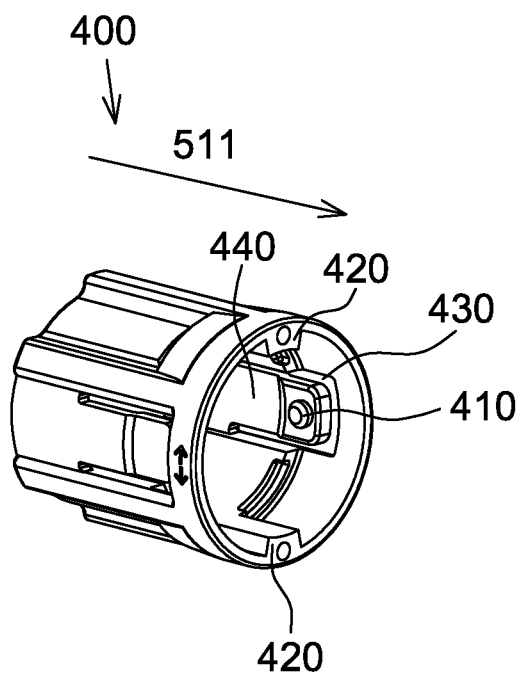

Referring to FIGS. 5a and 5b, the lock nut 400 is hollow and has a cylindrical body for being sleeved onto the inner housing 200 and covering the tabs 310. Two mutually opposite protrusions 420 are formed at the front section of the inner surface of the lock nut 400 and have a lengthwise direction parallel to the longitudinal direction 511. Two mutually opposite pins 410 are formed on the inner surface of the lock nut 400. In another embodiment, two mutually opposite openings 430 are formed on the lateral surface of the lock nut 400 and two cantilevers 440 are provided respectively in the openings 430. The cantilevers 440 extend from the lateral surface of the lock nut 400 and have a lengthwise direction parallel to the longitudinal direction 511. The two pins 410 are respectively coupled to the front sections of the two cantilevers 440.

Figure 6A:
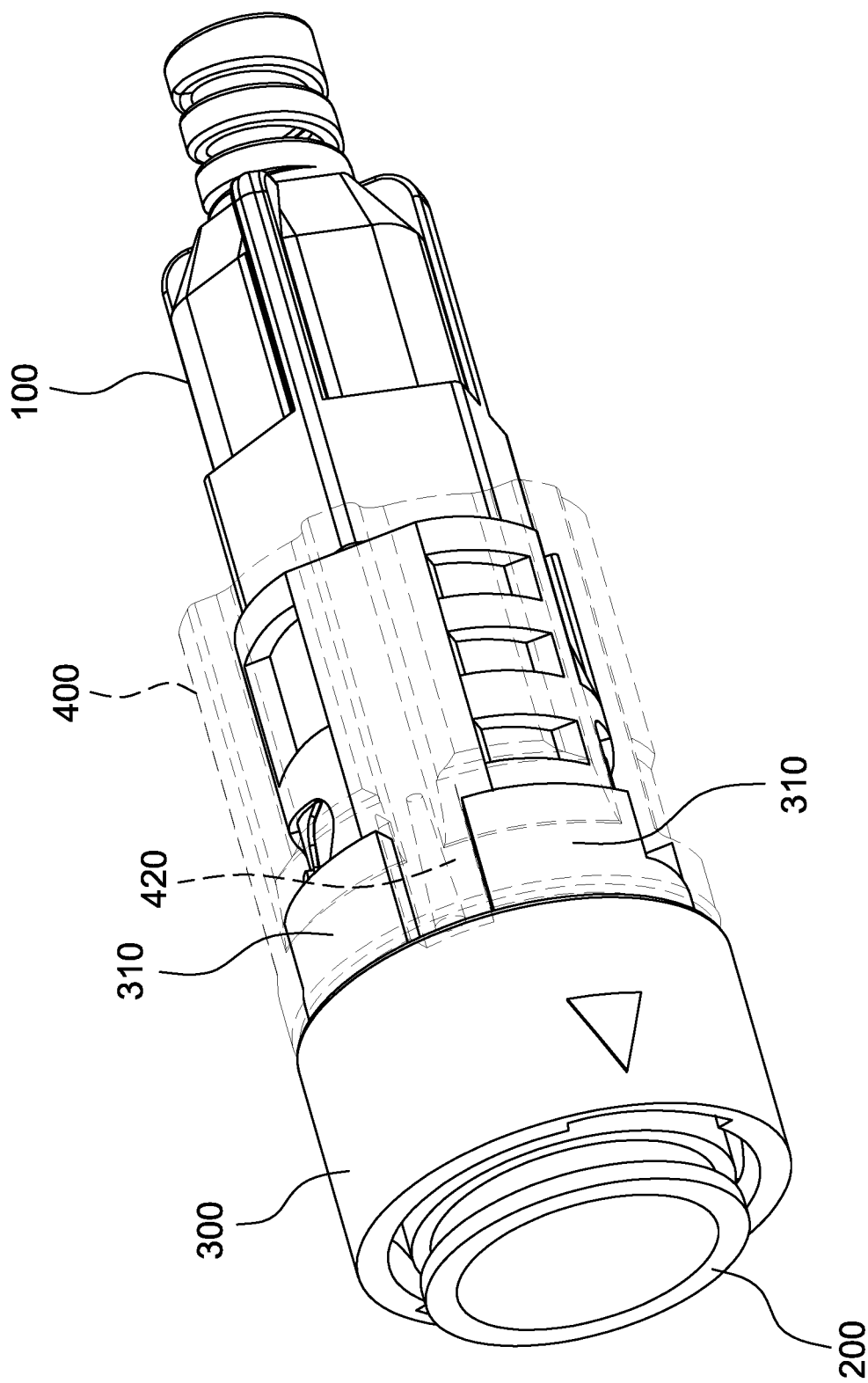
FIG. 6a is an elevated perspective view of the connector shroud according to the first embodiment of the present invention.
Figure 6B:
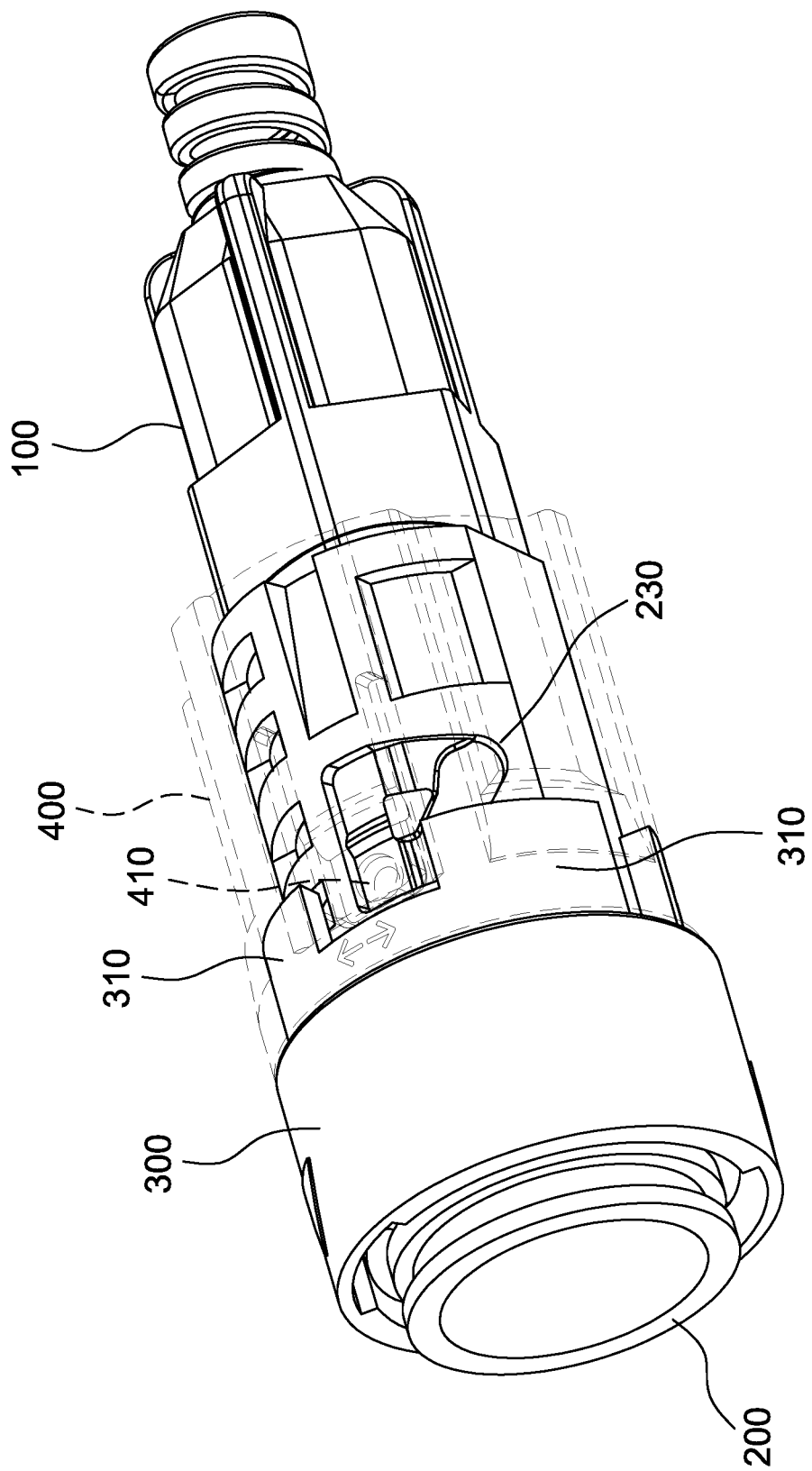
FIG. 6b is another elevated perspective view of the connector shroud according to the first embodiment of the present invention.

Referring to FIGS. 6a and 6b, which are two elevated perspective views illustrating the connector shroud according to the first embodiment of the present invention. The rear end of the inner housing 200 is coupled to the front end of the cable gland 100. The coupling nut 300 is sleeved onto the front section of the inner housing 200. The lock nut 400 is sleeved onto the middle section of the inner casing 200 and covers the tabs 310 of the coupling nut 300. The two projections 420 on the inner surface of the lock nut 400 are respectively arranged between two of the tabs 310 of the coupling nut 300. The two pins 410 on the inner surface of the lock nut 400 are respectively located in the two grooved control links 230 on the inner housing 200. The connectors to be shielded are arranged in the inner housing 200 (not shown).

Figure 7:
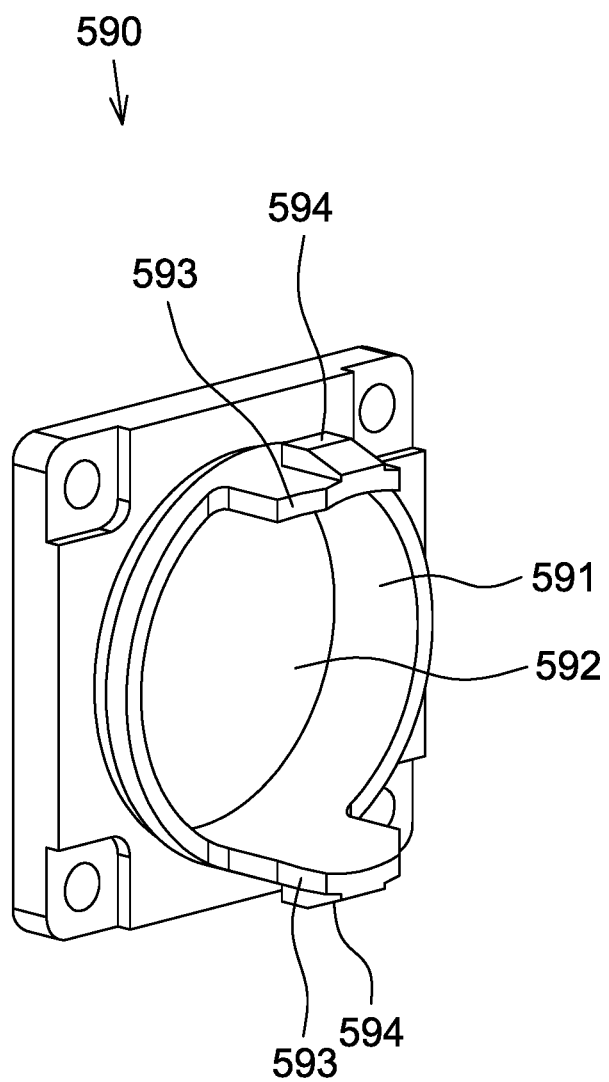
FIG. 7 is an elevated perspective view of a conventional adapter.

FIG. 7 shows a conventional flange 590, which is provided on an apparatus so that the connectors provided in the apparatus may be coupled to other connectors. The flange 590 has a square body, and each of its four corners is provided with a bolt hole to enable the flange 590 to be mounted to the apparatus. A circular opening 592 is arranged in the center of the body of the flange 590. The opening 592 is surrounded by an annular outer flange part 591. Two mutually opposite positioning tabs 593 extend from the outer flange part 591 and two bumps 594 are respectively provided on the positioning tabs 593.

Figure 8:
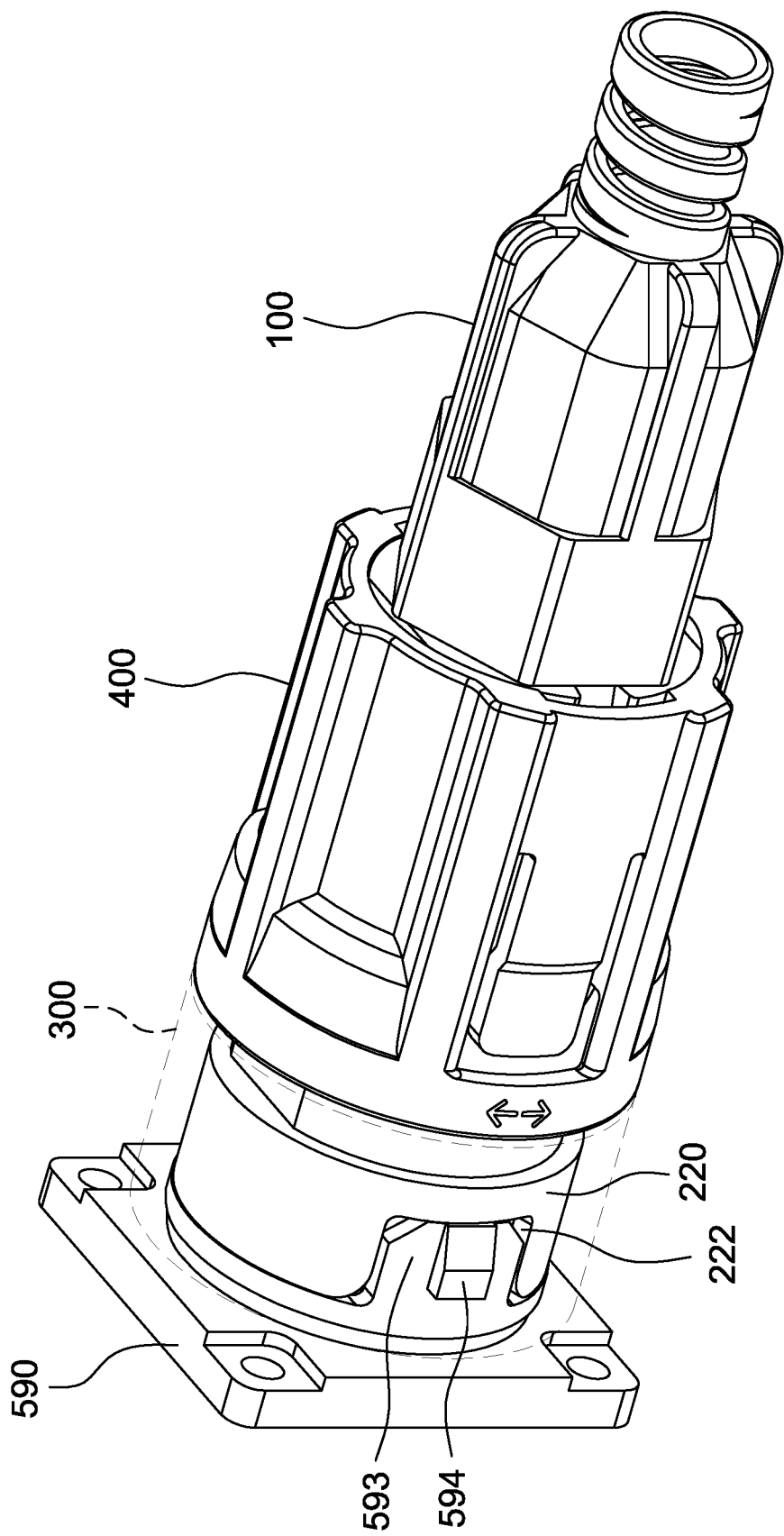
FIG. 8 is an elevated perspective view illustrating the combination of the connector shroud of FIG. 6a and the conventional adapter of FIG. 7.

Referring to FIG. 8, the connector shroud according to the first embodiment of the present invention may be mated with an object, such as the flange 590 of FIG. 7, so that the connectors provided in the connector shroud may be coupled with the connectors provided in the flange 590 (not shown). To mate with the flange 590, the front end of the inner housing 200 of the connector shroud is inserted into the outer flange part 591 of the flange 590 such that the positioning tabs 593 of the flange 590 are respectively positioned in the recesses 222 on the annular protrusion 220 of the inner housing 200. The inner housing 200 is restricted by the flange 590 and therefore cannot be rotated. Afterward the coupling nut 300 is twisted clockwise to allow the bumps 594 of the flange 590 to enter the receiving recesses 320 from the gaps 324 on the left side of the retaining walls 322 of the coupling nut 300, respectively. The coupling nut 300 is now locked on the flange 590 and the connector shroud is mated with the flange 590. If it is desired to detach the connector shroud from the flange 590, the coupling nut 300 is twisted counterclockwise such that the bumps 594 move out of the receiving recesses 320 from the gaps 324, respectively. In other embodiments, the coupling nut 300 is not limited to be coupled to the flange 590, and may be designed to be coupled to other objects.

Referring back to FIG. 3a, the two pins 410 of the lock nut 400 may respectively move in the grooved control links 230 on the inner housing 200 in the arrow direction. More specifically, the pins 410 may respectively move in the grooved control links 230 from the first section 231 through the second section 232 to the third section 233, and then back to the first section 231. The steps 241 and 243 may prevent the pins 410 from moving in the incorrect direction.

When the pins 410 are in the first sections 231, twisting the lock nut 400 clockwise allows the pins 410 to slide across the steps 241 to the second sections 232 respectively and causes the lock nut 400 to move toward the flange 590. When the pins 410 are in the second sections 232, pulling the lock nut 400 backward allows the pins 410 to slide across the bumps 242 respectively and causes the lock nut 400 to move away from the flange 590. When a user pulls the lock nut 400 to cause the pins 410 to pass over the bumps 242 respectively, the user will feel a change in resistance. This change in resistance provides the user with tactile feedback. When the pins 410 are in the third sections 233, twisting the lock nut 400 counterclockwise allows the pins 410 to slide across the steps 243 back to the first sections 231 respectively. It should be noted that twisting the lock nut 400 will not cause the inner housing 200 to rotate.

In the connector shroud of the present invention, the protrusions 420 on the inner surface of the lock nut 400 are each sandwiched by two of the tabs 310 of the coupling nut 300 as shown in FIG. 6a. The twisting of the lock nut 400 may drive the coupling nut 300 to rotate accordingly. Further, pulling the lock nut 400 backward will not pull the coupling nut 300. When the pins 410 are moved from the first sections 231 to the second sections 232 respectively, the coupling nut 300 rotates clockwise to be locked on the flange 590. If it is desired to unlock the coupling nut 300, pulling the lock nut 400 backward and then twisting the lock nut 400 in the reverse direction cause the pins 410 to slide from the second sections 232 to the third sections 233, respectively.

According to the connector shroud of the present invention, a user may twist the lock nut 400 to rotate the coupling nut 300 without need of directly twisting the coupling nut 300. In this way there is no need to vacate the space beside the coupling nut 300 for the user to twist the coupling nut 300. Therefore, the installation density of the connectors can be improved.

Figure 9:
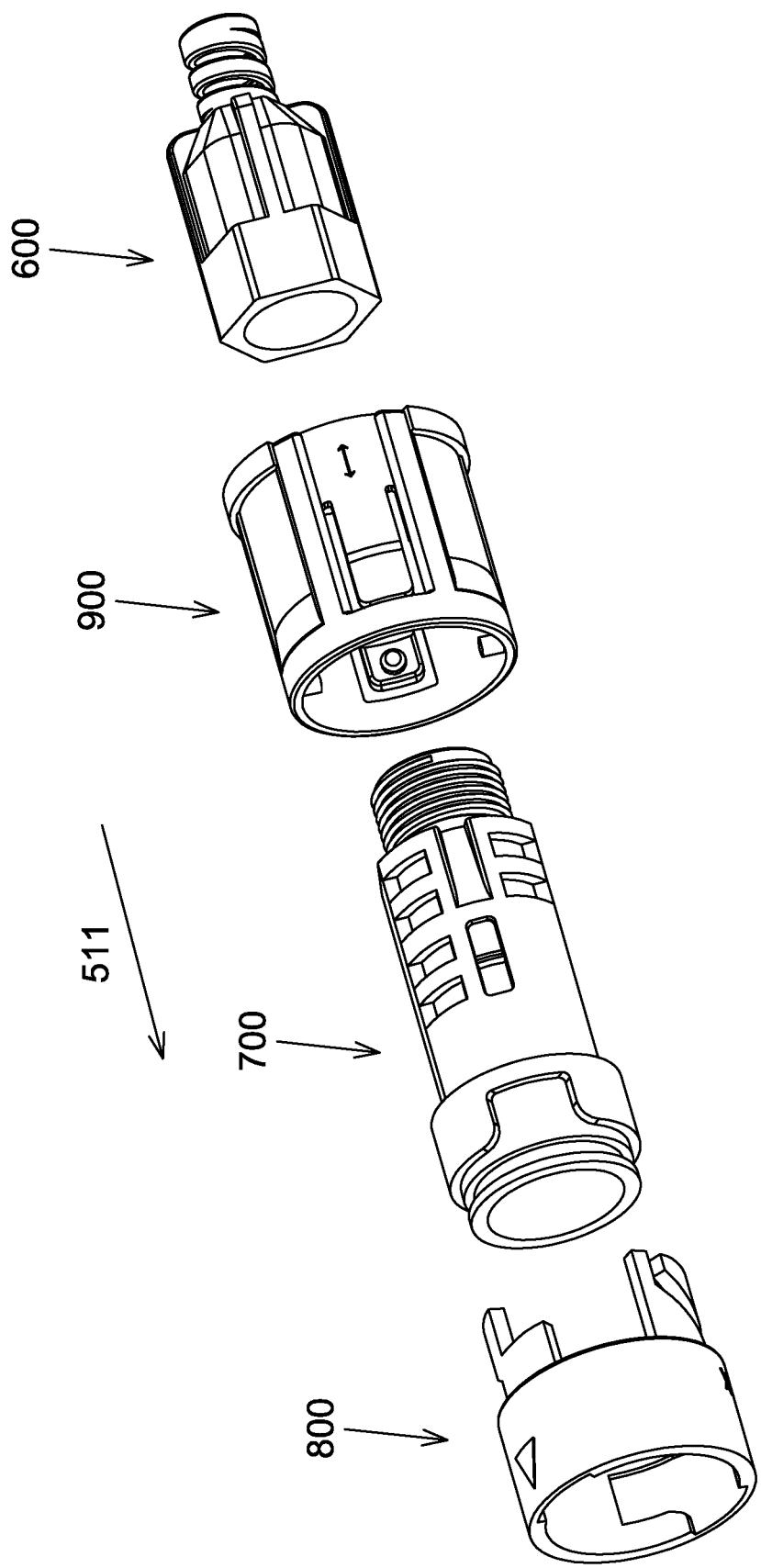
FIG. 9 is an exploded view of the connector shroud according to the second embodiment of the present invention.

Referring to FIG. 9, which is an exploded view of the connector shroud according to the second embodiment of the present invention. As shown in the figure, the connector shroud includes a cable gland 600, an inner housing 700, a coupling nut 800 and a lock nut 900. The cable gland 600, the inner housing 700, the coupling nut 800 and the lock nut 900 may be constructed of plastics by an injection molding process.

The cable gland 600 may be made from a flexible material and provide strain relief on cable (not shown) using materials and attachment techniques as are known in the art. The cable gland 600 has a hollow body whose lengthwise direction is parallel to a longitudinal direction 511. The cable gland 600 has a hexagonal shape at its front end for being coupled to the inner housing 700.

Figure 10A:
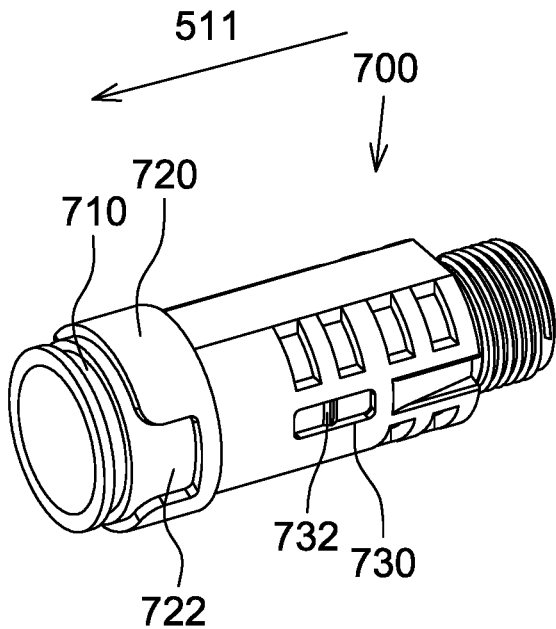
FIGS. 10a and 10b are different elevated perspective views of the inner housing of the connector shroud according to the second embodiment of the present invention.
Figure 10B:
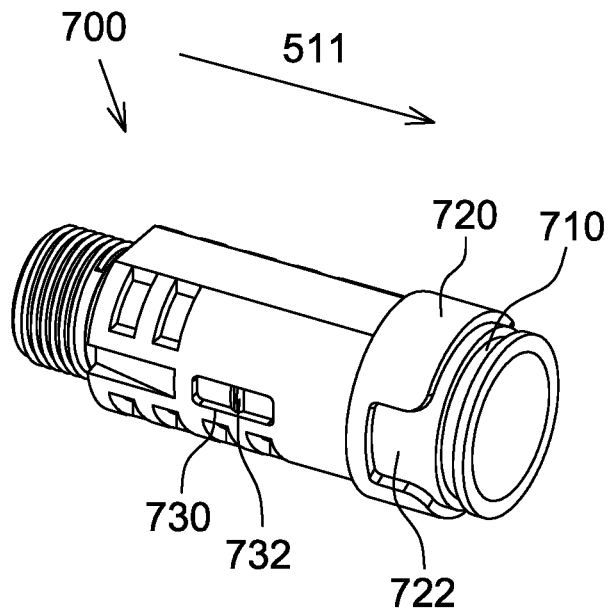

Referring to FIGS. 10a and 10b, the inner housing 700 is hollow and has a cylindrical body whose lengthwise direction is parallel to the longitudinal direction 511. An annular groove 710 is formed at the front section of the outer surface of the inner housing 700 for receiving a sealing ring (not shown). An annular protrusion 720 located behind the annular groove 710 is formed on the outer surface of the inner housing 700. Two mutually opposite recesses 722 are formed on the annular protrusion 720. Two identical grooved control links 730 are arranged on the outer surface of the inner housing 700 on two opposite sides and extend in the longitudinal direction 511. A bump 732 is formed at the bottom of the center of each of the grooved control links 730.

Figure 11A:
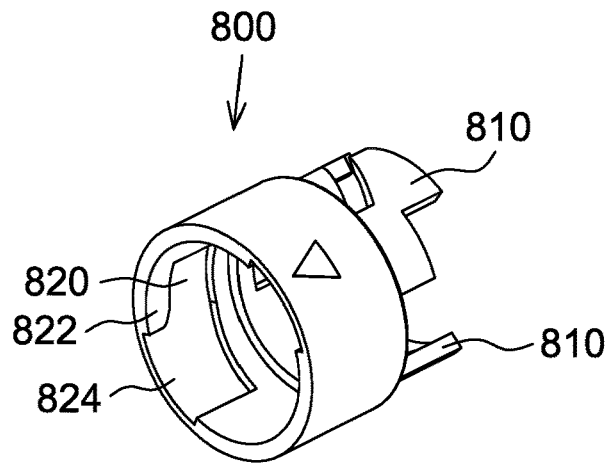
FIGS. 11a to 11c are different elevated perspective views of the coupling nut of the connector shroud according to the second embodiment of the present invention.
Figure 11B:
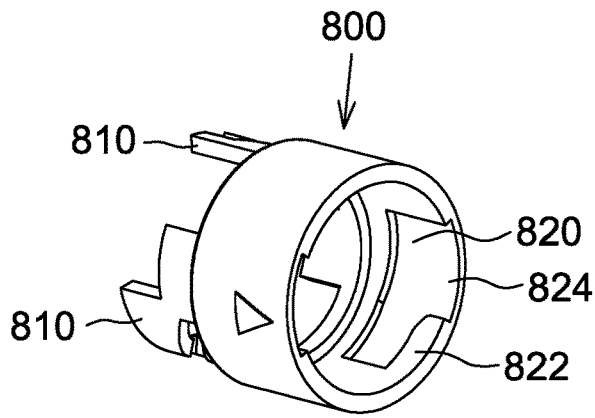
Figure 11C:
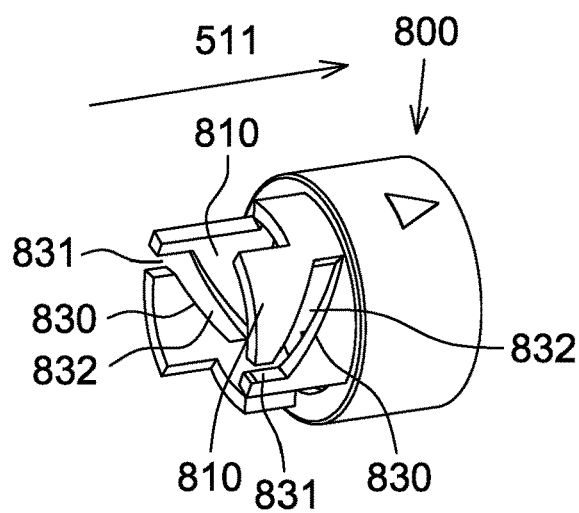

Referring to FIGS. 11a, 11b and 11c, the coupling nut 800 is hollow and has a cylindrical body for being sleeved onto the inner housing 700. Two mutually opposite receiving recesses 820 are formed at the front section of the inner surface of the coupling nut 800. A retaining wall 822 is arranged transversely in front of the receiving recess 820 and a gap 824 is formed on the left side of the retaining wall 822. Two mutually opposite tabs 810 with an arc-shaped cross-section protrude from the rear end of the coupling nut 800. Two identical and mutually opposite control slots 830 are respectively formed on the tabs 810. Each of the control slots 830 has substantially two functional sections including a first section 831 and a second section 832. The first section 831 extends from the rear end of the tab 810 in the longitudinal direction 511. The second section 832 communicates with the first section 831 and extends from the front end of the first section 831 toward the front end of the coupling nut 800 in a direction not parallel to the longitudinal direction 511.

Figure 12A:
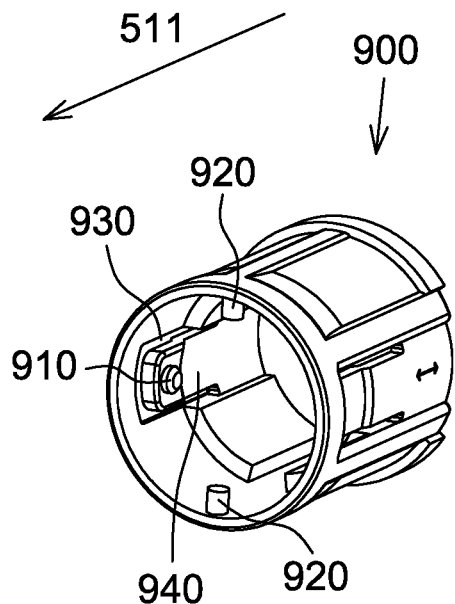
FIGS. 12a and 12b are different elevated perspective views of the lock nut of the connector shroud according to the second embodiment of the present invention.
Figure 12B:
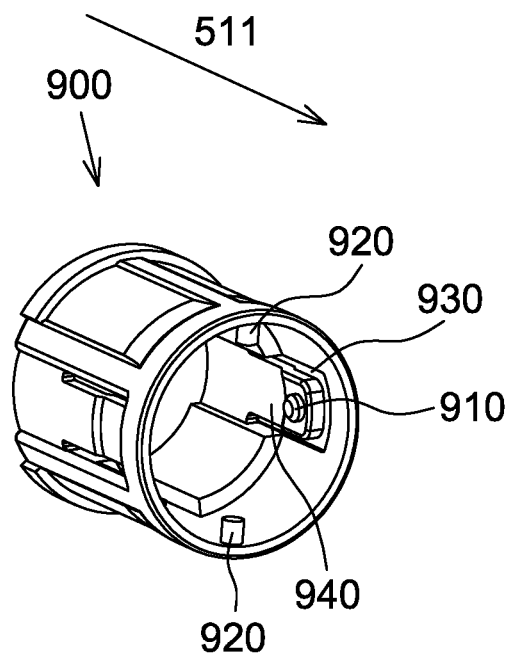

Referring to FIGS. 12a and 12b, the lock nut 900 is hollow and has a cylindrical body for being sleeved onto the inner housing 700 and covering the tabs 810 of the coupling nut 800. Two mutually opposite second pins 920 are formed at the front section of the inner surface of the lock nut 900. Two mutually opposite first pins 910 are formed on the inner surface of the lock nut 900. In another embodiment, two mutually opposite openings 930 are formed on the lateral surface of the lock nut 900 and two cantilevers 940 are provided respectively in the openings 930. The cantilevers 940 extend from the lateral surface of the lock nut 900 and have a lengthwise direction parallel to the longitudinal direction 511. The two first pins 910 are respectively coupled to the front sections of the two cantilevers 940.

Figure 13A:
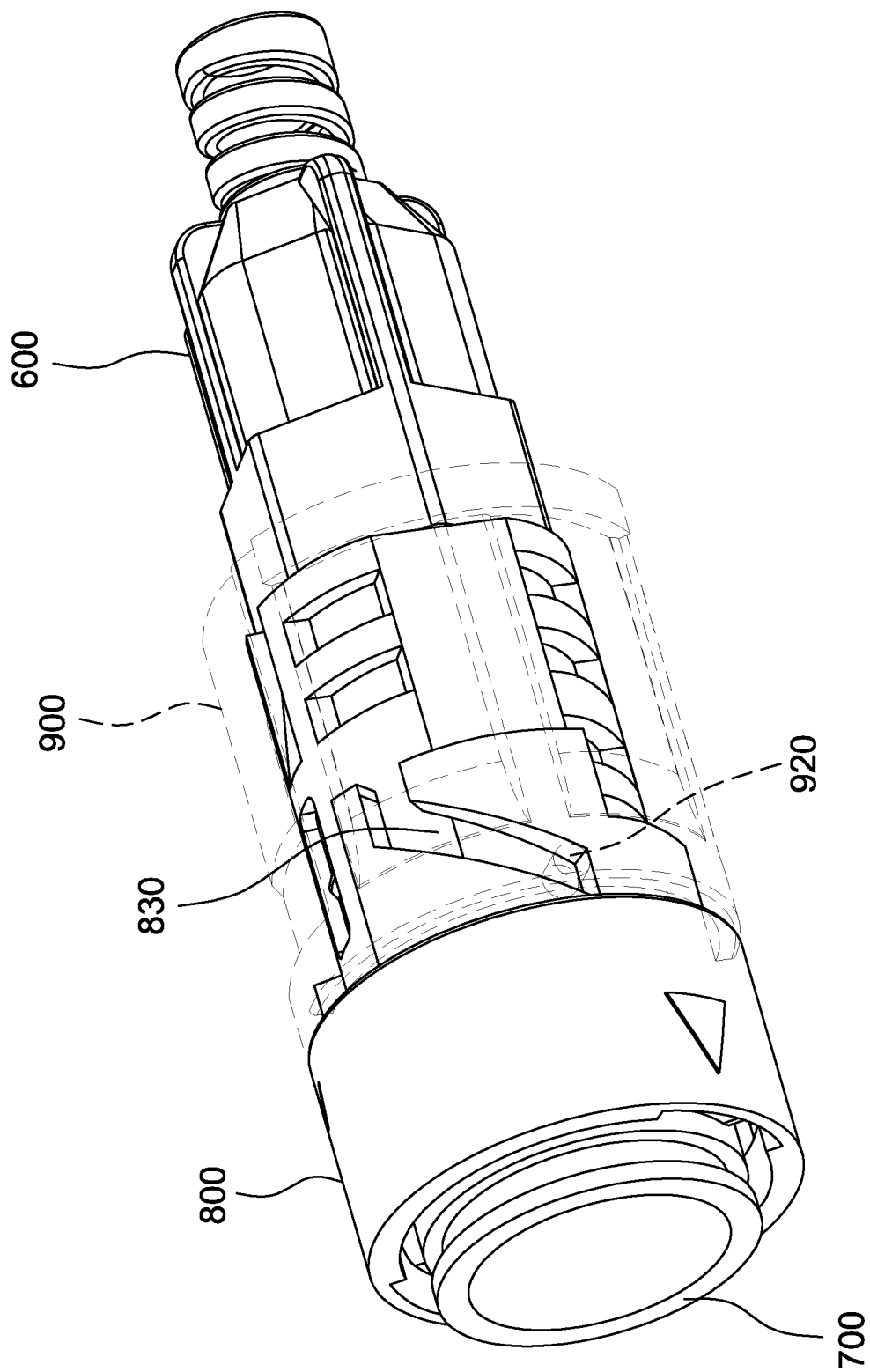
FIG. 13a is an elevated perspective view of the connector shroud according to the second embodiment of the present invention.
Figure 13B:
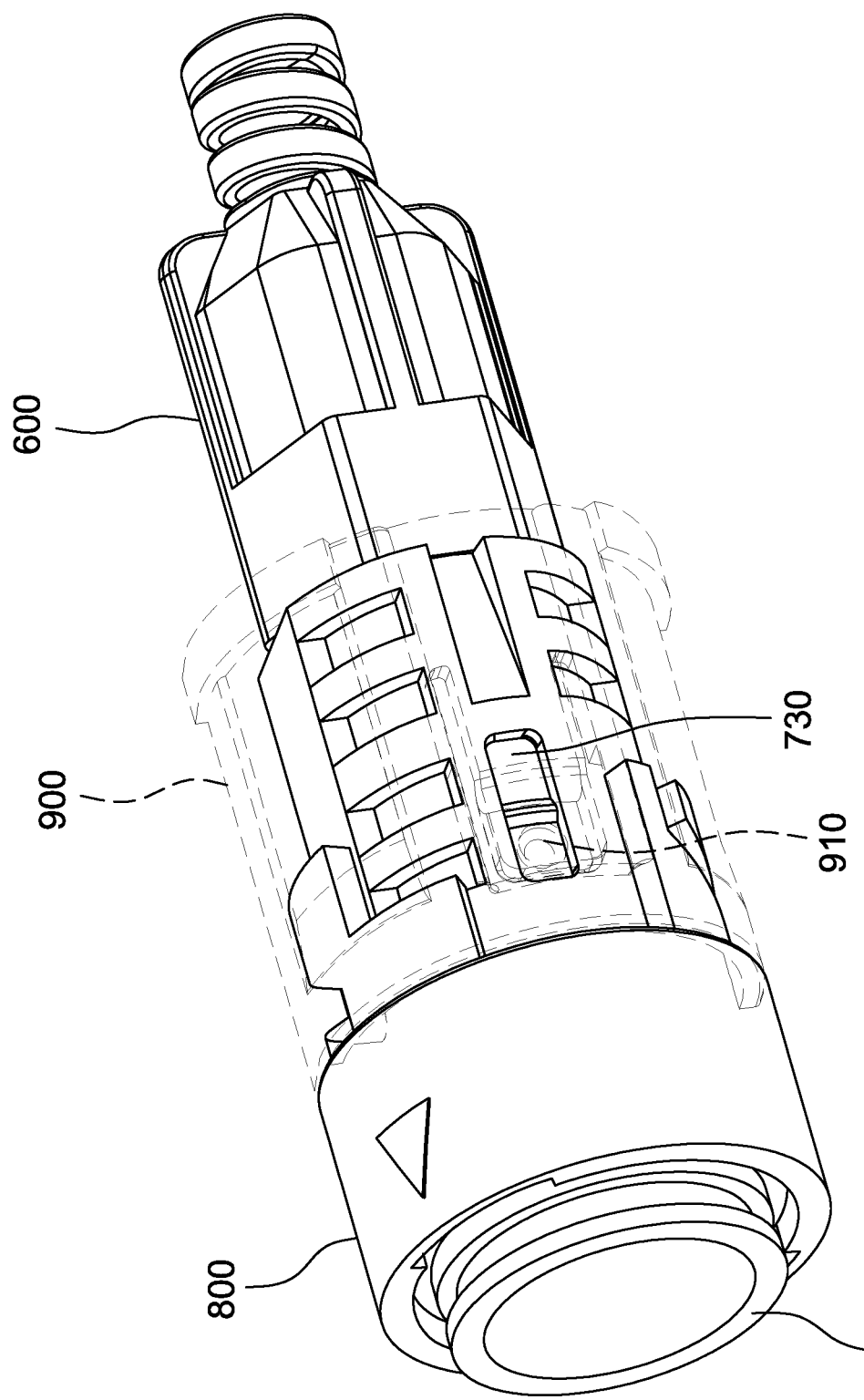
FIG. 13b is another elevated perspective view of the connector shroud according to the second embodiment of the present invention.

Referring to FIGS. 13a and 13b, which are two elevated perspective views illustrating the connector shroud according to the second embodiment of the present invention. The rear end of the inner housing 700 is coupled to the front end of the cable gland 600. The coupling nut 800 is sleeved onto the front section of the inner housing 700. The lock nut 900 is sleeved onto the middle section of the inner casing 700 and covers the tabs 810 of the coupling nut 800. The two first pins 910 on the inner surface of the lock nut 900 are respectively located in the two grooved control links 730 on the inner housing 700. The two second pins 920 on the inner surface of the lock nut 900 are respectively arranged in the two control slots 830 of the coupling nut 800. The connectors to be shielded are arranged in the inner housing 700 (not shown).

Figure 14:
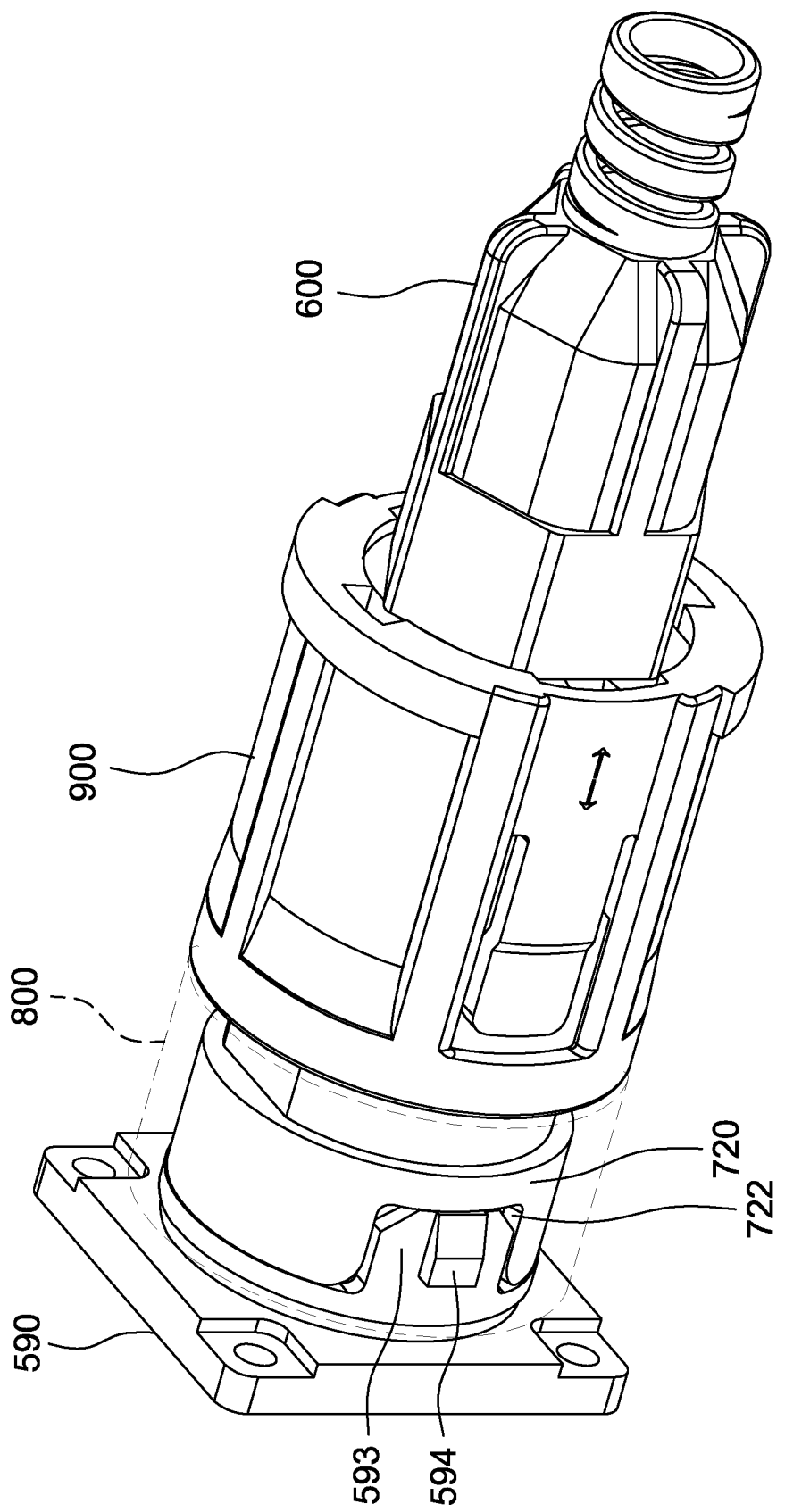
FIG. 14 is an elevated perspective view illustrating the combination of the connector shroud of FIG. 13a and the conventional adapter of FIG. 7.

Referring to FIG. 14, the connector shroud according to the second embodiment of the present invention may be mated with an object, such as the flange 590 of FIG. 7, so that the connectors provided in the connector shroud may be coupled with the connectors provided in the flange 590 (not shown). To mate with the flange 590, the front end of the inner housing 700 of the connector shroud is inserted into the outer flange part 591 of the flange 590 such that the positioning tabs 593 of the flange 590 are respectively positioned in the recesses 722 on the annular protrusion 720 of the inner housing 700. The inner housing 700 is restricted by the flange 590 and therefore cannot be rotated. Afterward the coupling nut 800 is twisted clockwise to allow the bumps 594 of the flange 590 to enter the receiving recesses 820 from the gaps 824 on the left side of the retaining walls 822 of the coupling nut 800, respectively. The coupling nut 800 is now locked on the flange 590 and the connector shroud is mated with the flange 590. If it is desired to detach the connector shroud from the flange 590, the coupling nut 800 is twisted counterclockwise such that the bumps 594 move out of the receiving recesses 820 from the gaps 824, respectively. In other embodiments, the coupling nut 800 is not limited to be coupled to the flange 590, and may be designed to be coupled to other objects.

Referring back to FIG. 10a, the two first pins 910 of the lock nut 900 may respectively move in the grooved control links 730 on the inner housing 700. When a user moves the lock nut 900 to cause the first pins 910 to pass over the bumps 732 respectively, the user will feel a change in resistance. This change in resistance provides the user with tactile feedback.

In the connector shroud of the present invention, the two second pins 920 of the lock nut 900 may move respectively in the two control slots 830 of the coupling nut 800. When the second pins 920 are in the first sections 831 respectively, pulling or pushing the lock nut 900 will not cause the coupling nut 800 to move because the first sections 831 are arranged parallel to the longitudinal direction 511. When the second pins 920 are in the second sections 832 respectively, pushing the lock nut 900 forward causes the coupling nut 800 to rotate clockwise and be locked on the flange 590. If it is desired to unlock the coupling nut 800, pulling the lock nut 900 backward causes the coupling nut 800 to rotate counterclockwise.

According to the connector shroud of the present invention, a user may move the lock nut 900 longitudinally to rotate the coupling nut 800 without need of directly twisting the coupling nut 800. In this way there is no need to vacate the space beside the coupling nut 800 for the user to twist the coupling nut 800. Therefore, the installation density of the connectors can be improved.

Although the invention has been explained in relation to its preferred embodiment, it is not used to limit the invention. It is to be understood that many other possible modifications and variations can be made by those skilled in the art without departing from the spirit and scope of the invention as hereinafter claimed.

What is claimed is:

1. A connector shroud, comprising:
   an inner housing having a grooved control link formed on an outer surface, the grooved control link having a first section, a second section, and a third section that communicate with each other, the second section extending in a longitudinal direction;
   a coupling nut sleeved onto the inner housing, the coupling nut being configured to be coupled to an object; and
   a lock nut sleeved onto the inner housing, the lock nut comprising a pin formed on an inner surface, the pin being movable in the grooved control link, wherein
   when the pin is in the second section, pulling the lock nut causes the lock nut to move away from the coupling nut, and
   when the pin is in the first section or the third section, twisting the lock nut causes the coupling nut to rotate.

2. The connector shroud as claimed in claim 1, wherein the lock nut further comprises a cantilever extending in the longitudinal direction in an opening, the pin being disposed on the cantilever.

3. The connector shroud as claimed in claim 1, wherein the coupling nut comprises two tabs extending from a rear end, the lock nut further comprising a protrusion formed on the inner surface, the protrusion being disposed between the two tabs.

4. The connector shroud as claimed in claim 1, wherein the inner housing comprises a bump formed in the second section of the grooved control link to provide a tactile feedback when the lock nut is moved to cause the pin to pass over the bump.

5. The connector shroud as claimed in claim 1, wherein the inner housing comprises a step formed at the junction of the first and second sections of the grooved control link to stop the pin from moving from the second section to the first section.

6. A connector shroud, comprising:
   an inner housing having a grooved control link formed on an outer surface, the grooved control link extending in a longitudinal direction;
   a coupling nut sleeved onto the inner housing, the coupling nut being configured to be coupled to an object, the coupling nut comprising a tab extending from a rear end, the tab having a control slot formed thereon, the control slot having a first section and a second section communicating with the first section, the second section extending in a direction not parallel to the longitudinal direction; and
   a lock nut sleeved onto the inner housing, the lock nut comprising a first pin and a second pin formed on an inner surface, the first pin being movable in the grooved control link and the second pin being movable in the control slot, wherein
   when the second pin is in the second section, a movement of the lock nut causes the coupling nut to rotate.

7. The connector shroud as claimed in claim 6, wherein the first section of the control slot extends in the longitudinal direction.

8. The connector shroud as claimed in claim 6, wherein the lock nut further comprises a cantilever extending in the longitudinal direction in an opening, the first pin being disposed on the cantilever.

9. The connector shroud as claimed in claim 6, wherein the inner housing comprises an annular protrusion formed on the outer surface, two mutually opposite recesses being formed on the annular protrusion.

10. The connector shroud as claimed in claim 6, wherein the inner housing comprises a bump formed in the grooved control link to provide a tactile feedback when the lock nut is moved to cause the first pin to pass over the bump.

* * * * *